US008912299B2

(12) United States Patent
Liu et al.

(10) Patent No.: US 8,912,299 B2
(45) Date of Patent: Dec. 16, 2014

(54) PREPARATION METHOD OF HIGH-PERFORMANCE STAR-SHAPED POLYCARBOXYLATE SUPERPLASTICIZER

(71) Applicant: Beijing University of Technology, Beijing (CN)

(72) Inventors: Xiao Liu, Beijing (CN); Ziming Wang, Beijing (CN); Suping Cui, Beijing (CN); Mingzhang Lan, Beijing (CN); Qianjin Mao, Beijing (CN); Hongxia Guo, Beijing (CN); Yali Wang, Beijing (CN); Jinbo Yang, Beijing (CN); Xiaoyu Ma, Beijing (CN); Jie Zhu, Beijing (CN)

(73) Assignee: Beijing University of Technology, Beijing (CN)

( * ) Notice: Subject to any disclaimer, the term of this patent is extended or adjusted under 35 U.S.C. 154(b) by 85 days.

(21) Appl. No.: 13/910,785

(22) Filed: Jun. 5, 2013

(65) Prior Publication Data

US 2014/0114030 A1    Apr. 24, 2014

(30) Foreign Application Priority Data

Oct. 22, 2012   (CN) .......................... 2012 1 0404859

(51) Int. Cl.
| | | |
|---|---|---|
| *C04B 24/26* | (2006.01) | |
| *C04B 24/16* | (2006.01) | |
| *C08F 290/06* | (2006.01) | |
| *C08F 220/18* | (2006.01) | |
| *C08F 220/06* | (2006.01) | |
| *C04B 103/32* | (2006.01) | |

(52) U.S. Cl.
CPC ............... *C04B 24/16* (2013.01); *C08F 220/18* (2013.01); *C04B 24/2641* (2013.01); *C04B 24/26* (2013.01); *C08F 220/06* (2013.01); *C08F 290/06* (2013.01); *C04B 24/2647* (2013.01); *C04B 2103/32* (2013.01)
USPC .......... 526/323.2; 526/75; 526/224; 526/229; 526/317.1; 526/328.5; 526/333

(58) Field of Classification Search
CPC   C04B 24/26; C04B 24/2641; C04B 24/2647; C08F 220/18; C08F 220/06; C10N 2220/029
USPC .......... 526/75, 224, 229, 317.1, 323.2, 328.5, 526/333
See application file for complete search history.

(56) References Cited

U.S. PATENT DOCUMENTS

2006/0106133 A1 *   5/2006   Tsubaki et al. ................ 523/160

FOREIGN PATENT DOCUMENTS

| CN | 1957006 A | 5/2007 |
|---|---|---|
| CN | 101585900 A | 11/2009 |
| CN | 102199298 A | 9/2011 |

*Primary Examiner* — Richard A Huhn
(74) *Attorney, Agent, or Firm* — J.C. Patents

(57) ABSTRACT

This invention relates to a method for preparing a star-shaped polycarboxylate superplasticizer by the first esterification step with polyol and (meth)acrylic acid as main reactants and the second polymerization step. In the first step, the star-shaped polymerizable active ends were synthesized by esterification between polyol and (meth)acrylic acid in the presence of catalyst. In the second step, the final star-shaped polycarboxylate superplasticizer was prepared by radical polymerization among the product obtained in first step, unsaturated polyoxyethylene ethers, molecular weight regulator and unsaturated carboxylic acid in the presence of initiator. The production process of this invention exhibits some characteristics including simple, easily controllable, high polymerization degree, low cost and pollution free. The star-shaped molecular structure of polycarboxylate superplasticizer can be achieved through synthesizing active "core" by esterification and "arm" by radical polymerization. It showed better cement paste fluidity and fluidity retention, which manifested as better adaptability to cement and application performance in concrete, than both traditional linear and comb-shaped polycarboxylate superplasticizer at common or lower dosage.

4 Claims, 1 Drawing Sheet

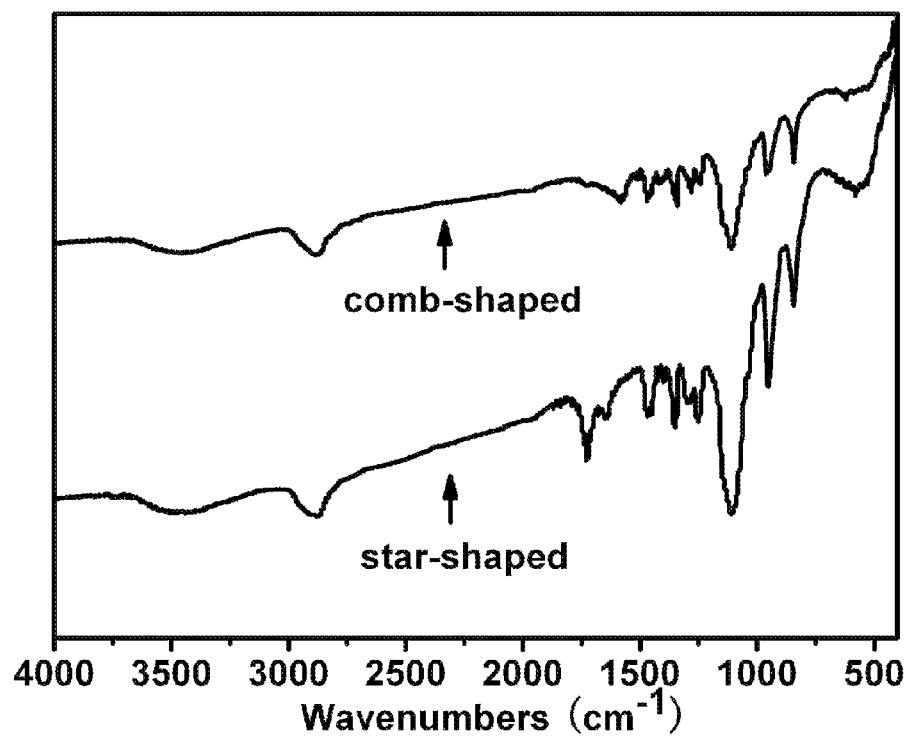

PREPARATION METHOD OF HIGH-PERFORMANCE STAR-SHAPED POLYCARBOXYLATE SUPERPLASTICIZER

CROSS-REFERENCE TO RELATED APPLICATION

This application claims the priority benefit of China application No. 201210404859.X, filed on Oct. 22, 2012. All disclosure of the China application is incorporated herein by reference in its entirety and made a part of this specification.

TECHNICAL FIELD

This invention relates to the technical field of high-performance polycarboxylate superplasticizer used in cement and concrete, and especially relates to a typical preparation method of star-shaped polycarboxylate superplasticizer synthesized by the first esterification between polyol and acrylic monomer to obtain active core and then the second copolymerization.

BACKGROUND

Nowadays, with the rapid development of construction industry and the continuous improvement of material design, a higher requirement to admixture is put forward. In recent decades, some new technologies, including large template, sliding mould, pumping concrete, vacuum dehydration concrete, shotcrete and so on, increasingly appear in the construction field. Furthermore, the commercial concrete and batch mixing method appear in the supply field of concrete, as well as in the field of structural engineering, there are high-rise, super high-rise, large span, folded plate, thin shell, framed light-weight panel system, shear wall system, assembly structure, box structure, unbounded prestressed concrete system, and frame-tube system occurred. With the rising of these new technologies, new methods, and new structures, the higher and newer requirements for concrete's construction performance and economic indicators are put forward. For instance, the modern concrete requires greater performance involving liquidity, plasticity, frost resistance, impermeability, compaction density, retarding, rapid hardening, high strength, and so on. Therefore, the concrete admixture used in the past cannot meet the requirement of modern construction. Moreover, a higher requirement is put forward for each component of the green and high-performance concrete, especially for concrete admixture.

The continuous development of design and synthesis for molecular structure in polymer subject provides the theoretical basis for us to "repair" an ideal molecular structure. In recent years, star-shaped polymer is paid more and more attention by researchers because of its good solubility, low viscosity, multi-function, high reactivity and a larger volume space. Consequently, a star-shaped polycarboxylate superplasticizer was designed and synthesized by copolymerizing the conventional comb-shaped polymers with the active "cores" which contained a large number of polymerizable ends. The characteristic of multi-arm for this star-shaped copolymer can ensure more effective stereo-hindrance effect. The great application potential can be shown for it exhibits not only the performance of conventional comb-shaped polymer but also the special nature of star-shaped polymer.

The patent CN102199298A (publication date: Sep. 28, 2011) reported a preparation method of comb-shaped polycarboxylate surfactant. This invention stated a comb-shaped surfactant synthesized through three steps: the first intermediate polymer copolymerized between acrylic acid and its ester monomer in the presence of initiator and flowing nitrogen at the set heating temperature; the second grafting reaction by adding the grafting compound, catalyst and solvent; and the last product precipitation by using precipitating agent after removing the solvent by reducing pressure. This invention has the advantages of reasonable technology, simple operation, low preparation cost, mild reaction conditions and good product quality, but still belongs to a traditional comb-shaped polycarboxylate product without star-shaped polymer's some unique advantages. Therefore, the qualitative leap and breakthrough cannot be achieved essentially for the structure of polycarboxylate surfactant.

The patent CN1957006A (publication date: May 2, 2007) reported a preparation method of star-shaped acrylic polymer. The objective of this invention was to provide a structure-controllable star-shaped acrylic polymer with a narrow molecular-weight distribution and acid decomposability, which had the polyacrylate-derived polymer chain as "core" part, as well as the (meth)acrylate-derived polymer chain as "arm" part. This patent disclosed a novel star-shaped polyacrylic derivative without describing application fields. It is hard to be applied in the field of concrete admixture because the superplasticizer's side-chain-like stereo-hindrance effect is difficult to be achieved without using polyethylene glycol compounds as reactants. Besides, the complicated synthesis process, strict reaction conditions, high polymerization cost and insufficient popularizing prospect, together with the obtained star-shaped polycarboxylate superplasticizer without an ideal structure, imply an unknown application performance.

The patent CN101585900A (publication date: Nov. 25, 2009) reported a preparation method of concrete polycarboxylate superplasticizer. This method had two steps including an esterification and a polymerization. Typically, the esterification was carried out by using the methoxy polyethylene glycol (MPEG) and meth acrylic acid as main reactants and adding polymerization inhibitor and catalyst. When the esterification finished, the esterification product was diluted to a concentration of 73% and adjusted to pH value of 3.5-4.0, followed by adding mercaptopropionic acid and then cooled to 43° C. The resultant and demineralized water as the ratio of 20:8 were pumped into two elevated tanks respectively and then the aqueous solution of initiator was uniformly dropped into reactor followed by polymerization for 4 hours at constant temperature. After cooling, the pH value was adjusted by adding alkali liquor, and finally the concrete polycarboxylate superplasticizer was obtained. This invention solved the sensitivity problem of superplasticizer's dosage, and the produced polycarboxylate superplasticizer exhibited the low cost, high water-reducing ratio, good adaptability to cement and easy industrialized production. Although the polycarboxylate superplasticizer with comb-shaped structure can be achieved by both esterification and polymerization, it still belongs to the traditional comb-shaped structure's category, and didn't achieve the improvement of application performance only simply by changing synthetic process but not by designing new-type molecular structure.

The concrete superplasticizers or surfactants described in the most patents have already good workability such as fluidity and adaptability to cement. However, the preparation methods described above all have some disadvantages, involving that the synthesized polycarboxylate superplasticizers still have the traditional comb-shaped structures, and the excellent application performances in cement or concrete are achieved mostly through researchers' changing reaction materials or process conditions but seldom through changing polymer structure from the design of molecular structure.

Some star-shaped acrylic polymer are not referenced or applied in the field of concrete admixture, but it is a fact that increasing the polymer density is beneficial to distinct improvement in polymer's action efficiency and application performance. Hence, it is required that the synthetic polycarboxylate superplasticizers do not only change the traditional comb-shaped structure into the more efficient star-shaped structure to further achieve the excellent workability, but also ensure a simple process operation and low preparation cost to easy to industrialize. The related research has not been reported in domestic and abroad.

SUMMARY

The objective of this invention is to provide a preparation process of star-shaped polycarboxylate superplasticizer with excellent performance prepared through the radical polymerization among star-shaped polymerizable active ends which synthesized by the esterification between polyol and (meth) acrylic acid, unsaturated polyoxyethylene ether, molecular weight regulator, and unsaturated carboxylic acids, in the presence of initiator. From the theory of molecular structure design, the polymer chains as "arms" are connected together to form a novel star-shaped polycarboxylate superplasticizer by introducing the starting agent's participation in esterification process, which can significantly improve the work efficiency and widen the polymer structure-property research's application in the field of concrete admixture. The star-shaped polycarboxylate superplasticizer synthesized by using this method had smaller atomic spatial arrangement size and spherical symmetric structure, weaker entanglement and interaction between macromolecules, and more extended polymer chains owing to repulsion among multi-branched molecules, leading to stronger stereo-hindrance effect. Thus, the adverse effects of cement particle's flocculation and hydration on the flow properties can be effectively prevented, manifesting as more excellent workability than those with conventional comb-shaped structure.

The star-shaped polycarboxylate superplasticizer's preparation method involving the first esterification and the second polymerization is provided in this patent. The synthesis conditions and steps were as follows:

(1) Esterification: Firstly polyol was added to the reactor with a risen temperature to 40-80° C., and then the polymerization inhibitor, (meth)acrylic acid and catalyst were orderly added to the reactor with each interval of 5-20 minutes and constant stirring. The water-carrying agent was added when the temperature reached 80-100° C. After continual heating to 100-150° C., the esterification was carried out, and during this process the produced water was separated by water-carrying agent. After reaction for 2-10 hours, the water-carrying agent was removed by vacuum pumping, and the esterification product was obtained;

(2) Polymerization: The above esterification product and water were added to the reactor with a risen temperature to 50-65° C. for stirring 10-30 minutes, and then the unsaturated polyoxyethylene ether, molecular weight regulator, (meth)acrylic acid or its mixture with unsaturated carboxylic acids, and the persulfate solution with a mass concentration of 1-30% as initiator were orderly added to the reactor with each interval of 5-20 minutes and constant stirring. After continual heating to 65-90° C., the polymerization was carried out. After reaction for 1.5-8 hours, the temperature was lowered to 40-60° C. and the product was neutralized by alkaline solution with a mass concentration of 10-50% to adjust pH value to 6-8. When cooling to 25-40° C., the star-shaped polycarboxylate superplasticizer solution with an expected concentration was finally obtained by mixing appropriate amount of water.

In the above-mentioned step (1), the polyol used in esterification was glycerol, trimethylol ethane, trimethylol propane, pentaerythritol, xylitol, mannitol or sorbitol; the inhibitor used in esterification was hydroquinone, phenothiazine, p-tert-butylcatechol or hydroquinone monomethyl ether, with the mass dosage of 0.05-5% of the (meth)acrylic acid; the catalyst used in esterification was p-toluenesulfonic acid, phosphoric acid or sulfamic acid, with the mass dosage of 1.5-10% of all the reactants; the water-carrying agent used in esterification was cyclohexane, benzene or toluene, with the mass dosage of 8-30% of all the reactants, and the referred reactants were polyol and (meth)acrylic acid; the molar ratio of (meth)acrylic acid to polyol was 3-10:1.

In the above-mentioned step (2), the mass of added water was 80-120% of the mass of the unsaturated polyoxyethylene ether and (meth)acrylic acid or its mixture with unsaturated carboxylic acids; the unsaturated polyoxyethylene ether was allyl polyethylene glycol, methyl alkenyl polyethylene glycol, isobutenyl polyethylene glycol or isopentenyl polyethylene glycol; the molecular weight regulator was mercaptoacetic acid, mercaptopropionic acid, sodium methallyl sulfonate, sodium allyl sulfonate or n-dodecyl mercaptan, with the molar ratio of 0.05-0.75:1 to the unsaturated polyoxyethylene ether; the unsaturated carboxylic acids were one or several of itaconic acid, maleic acid (anhydride) and fumaric acid, with the molar ratio of 0.1-5:1 to (meth)acrylic acid mentioned in step (2); the persulfate initiator was ammonium persulfate, potassium persulfate or sodium persulfate, with the molar ratio of 0.05-0.5:1 to the unsaturated polyoxyethylene ether; the solute of the alkaline solution was sodium hydroxide, potassium hydroxide, ethylenediamine or triethanolamine, with the molar ratio of 0.7-1.2:1 to the (meth)acrylic acid or its mixture with unsaturated carboxylic acids mentioned in step (2); the molar ratio of the unsaturated polyoxyethylene ether to the esterification product was 5-50:1; the molar ratio of (meth)acrylic acid or its mixture with unsaturated carboxylic acids to the unsaturated polyoxyethylene ether was 1.5-4:1.

The unsaturated polyoxyethylene ether in this invention has a number-average molecular weight of 500-3000.

Compared with the prior synthetic process, the preparation method in this invention has several beneficial effects as follows:

1. From the theory of molecular structure design, this invention reported that the star-shaped polycarboxylate superplasticizer was finally prepared by radical copolymerization between acrylic monomer and the active ends with a large amount of unsaturated bond, which were synthesized through the esterification by using polyhydroxy-structural polyol as starting agent. This is a further innovation in the field of superplasticizer structure after its development from linear shape to comb shape. The structure novelty can not only achieve change in the superplasticizer application, but also be beneficial to expanding the theoretical connotation of polymer molecular design-structure-performance, further widening the research scopes of subsequent new-type polycarboxylate superplasticizer.

2. The synthesized star-shaped polycarboxylate superplasticizer has multiple-branched structure with adequate "arm length", which can play a stereo-hindrance effect to prevent macromolecules from being wrapped by hydration products effectively. Moreover, many polymer chains are connected together by "active cores", which can not only improve the energy-efficiency, but also exhibit better results in preventing flocculation of cement particles and improving stability of cement paste. This polycarboxylate superplasticizer product with unique advantages and distinctive characteristics has good market competitiveness and application prospects due to its diversified application in the fields of fine chemicals and surfactant.

3. The preparation process has characteristics of low energy-consumption, safety, environment-friendly technology, mild conditions, no solvent-toxicity, cleaner production, non-pollution, and no nitrogen-protected synthesis. The used water-carrying agent still can be recycled after liquid-separation operation, which is greatly advantageous to reducing the production cost and the waste of raw materials. The reflux condensation of water-carrying agent also can balance the system temperature with little fluctuation and lower the system viscosity, leading to more homogeneous mixing and higher esterification rate. Besides, the used unsaturated polyoxyethylene ether and unsaturated carboxylic acid monomers have wide applicable range of molecular weight, which is beneficial to the diversified product's popularization and the increase of star-shaped polycarboxylate superplasticizer's market share.

4. Compared with the traditional methods, this synthetic method is simple and easy-controllable, manifesting as the common raw materials for reaction and the conventional process such as esterification and polymerization. This method has the obvious characteristics of high-efficiency and convenience so that easily realize the industrial production, and can enrich the preparation method of polycarboxylate superplasticizer. The preparation process retains the functional groups contributing good dispersion and retention effect reported in the conventional method, and in addition, has the advantages of good molecular design ability, controllable molecular weight, narrow molecular weight distribution and high polymerization degree based on no specific requirements for reaction equipment, providing good practical application and potential.

5. Compared with traditional line-shape and comb-shape polycarboxylate superplasticizer, the synthesized star-shaped polycarboxylate superplasticizer exhibits more excellent workability, dispersing ability, slump retaining, fluidity and its retention at lower dosage, and exhibits better adaptability to different types of cements. Furthermore, this product of star-shaped polycarboxylate superplasticizer shows steady state, including no stratification at high concentration, no crystallization and good storage stability at low temperature. The product synthesized by this simple process still has excellent performance, which is beneficial to achieving industrial popularization and application, and thus there is a good economic and social significance.

BRIEF DESCRIPTION OF DRAWING

FIG. 1. Fourier transform infrared spectra (FTIR) of the synthesized star-shaped polycarboxylate superplasticizer in this invention and the contrastive comb-shaped polycarboxylate superplasticizer.

The synthesized star-shaped polycarboxylate superplasticizer and the contrastive comb-shaped polycarboxylate superplasticizer samples were dried in an oven at 80° C. to constant weight, and then their FTIR measurements were carried out, which results are shown in FIG. 1. At 1730 cm$^{-1}$ corresponding to ester group (—COO—) in FIG. 1, star-shaped polycarboxylate superplasticizer exhibits a significantly higher peak. The structural difference between the two superplasticizers is that each "arm" of star-shaped polycarboxylate superplasticizer is connected with its "core" through ester group (—COO—), and thus the existence of star-shaped structure is proved by this FTIR results.

DETAILED DESCRIPTION OF EMBODIMENTS

This invention is further specified by combining with the following examples, but the implementation of this invention is not restricted to this.

EXAMPLE 1

Firstly 20.13 g of trimethylol propane was added to the reactor with a risen temperature to 40° C., and then 0.02 g of hydroquinone monomethyl ether, 38.74 g of methacrylic acid and 0.88 g of sulfamic acid were orderly added to the reactor with each interval of 20 minutes and constant stirring. 17.66 g of toluene was added when the temperature reached 80° C. After continual heating to 150° C., the esterification was carried out, and during this process the produced water was separated by toluene. After reaction for 2 hours, the water-carrying agent was removed by vacuum pumping, and the esterification product was obtained. 0.23 g of esterification product and 72.97 g of water were added to the reactor with a risen temperature to 50° C. for stirring 30 minutes, and then 50 g of allyl polyethylene glycol (molecular weight=500), 0.46 g of mercaptoacetic acid, 10.81 g of acrylic acid, and 3.8 g of ammonium persulfate solution with a mass concentration of 30% were orderly added to the reactor with each interval of 20 minutes and constant stirring. After continual heating to 65° C., the polymerization was carried out. After reaction for 8 hours, the temperature was lowered to 40° C. and the product was neutralized by 14.4 g of sodium hydroxide solution with a mass concentration of 50% to adjust pH value to 6.2. When cooling to 25° C., the star-shaped polycarboxylate superplasticizer solution with a mass concentration of 40% was finally obtained by mixing with 21.93 g of water.

EXAMPLE 2

The performance of polycarboxylate superplasticizer with a mass concentration of 40% prepared in example 1 was measured after storing 30 days at 6° C.

EXAMPLE 3

Firstly 10.93 g of mannitol was added to the reactor with a risen temperature to 80° C., and then 2.16 g of hydroquinone, 43.24 g of acrylic acid and 5.42 g of p-toluenesulfonic acid were orderly added to the reactor with each interval of 5 minutes and constant stirring. 16.25 g of cyclohexane was added when the temperature reached 100° C. After continual heating to 140° C., the esterification was carried out, and during this process the produced water was separated by cyclohexane. After reaction for 3 hours, the water-carrying agent was removed by vacuum pumping, and the esterification product was obtained. 0.53 g of esterification product and 51.75 g of water were added to the reactor with a risen temperature to 65° C. for stirring 10 minutes, and then 60 g of isobutenyl polyethylene glycol (molecular weight=3000), 3.04 g of n-dodecyl mercaptan, 0.6 g of acrylic acid mixed with 4.09 g of maleic anhydride, and 142.87 g of ammonium persulfate solution with a mass concentration of 1% were orderly added to the reactor with each interval of 5 minutes and constant stirring. After continual heating to 90° C., the polymerization was carried out. After reaction for 1.5 hours, the temperature was lowered to 60° C. and the product was neutralized by 19.64 g of potassium hydroxide solution with a mass concentration of 10% to adjust pH value to 6.0. When cooling to 40° C., the star-shaped polycarboxylate superplasticizer solution with a mass concentration of 20% was finally obtained by mixing with 75.73 g of water.

EXAMPLE 4

The performance of polycarboxylate superplasticizer with a mass concentration of 20% prepared in example 3 was measured after storing 20 days at 5° C.

EXAMPLE 5

Firstly 10.89 g of pentaerythritol was added to the reactor with a risen temperature to 50° C., and then 0.03 g of p-tert-butylcatechol, 28.82 g of acrylic acid and 0.79 g of phosphoric acid were orderly added to the reactor with each interval of 15 minutes and constant stirring. 3.18 g of benzene was added when the temperature reached 85° C. After continual heating to 100° C., the esterification was carried out, and during this process the produced water was separated by benzene. After reaction for 10 hours, the water-carrying agent was removed by vacuum pumping, and the esterification product was obtained. 0.88 g of esterification product and 98.17 g of water were added to the reactor with a risen temperature to 55° C. for stirring 25 minutes, and then 100 g of methyl alkenyl polyethylene glycol (molecular weight=1000), 1.06 g of mercaptopropionic acid, 13.12 g of acrylic acid mixed with 2.37 g of itaconic acid, and 9.65 g of potassium persulfate solution with a mass concentration of 28% were orderly added to the reactor with each interval of 15 minutes and constant stirring. After continual heating to 70° C., the polymerization was carried out. After reaction for 7 hours, the temperature was lowered to 45° C. and the product was neutralized by 15 g of sodium hydroxide solution with a mass concentration of 48% to adjust pH value to 7.0. When cooling to 28° C., the star-shaped polycarboxylate superplasticizer solution with a mass concentration of 50% was finally obtained by mixing with 14.42 g of water.

EXAMPLE 6

The performance of polycarboxylate superplasticizer with a mass concentration of 50% prepared in example 5 was measured after storing 20 days at 5° C.

EXAMPLE 7

Firstly 18.22 g of sorbitol was added to the reactor with a risen temperature to 60° C., and then 0.04 g of phenothiazine, 60.26 g of methacrylic acid and 3.14 g of p-toluenesulfonic acid were orderly added to the reactor with each interval of 17 minutes and constant stirring. 15.7 g of toluene was added when the temperature reached 90° C. After continual heating to 110° C., the esterification was carried out, and during this process the produced water was separated by toluene. After reaction for 5 hours, the water-carrying agent was removed by vacuum pumping, and the esterification product was obtained. 0.18 g of esterification product and 109.31 g of water were added to the reactor with a risen temperature to 58° C. for stirring 20 minutes, and then 80 g of isopentenyl polyethylene glycol (molecular weight=2000), 2.53 g of sodium methallyl sulfonate, 5.76 g of acrylic acid mixed with 9.29 g of maleic acid, and 27.03 g of potassium persulfate solution with a mass concentration of 20% were orderly added to the reactor with each interval of 10 minutes and constant stirring. After continual heating to 75° C., the polymerization was carried out. After reaction for 5.5 hours, the temperature was lowered to 50° C. and the product was neutralized by 48.1 g of ethylenediamine solution with a mass concentration of 20% to adjust pH value to 7.4. When cooling to 30° C., the star-shaped polycarboxylate superplasticizer solution with a mass concentration of 35% was finally obtained by mixing with 40.06 g of water.

EXAMPLE 8

The performance of polycarboxylate superplasticizer with a mass concentration of 35% prepared in example 7 was measured after storing 30 days at 6° C.

EXAMPLE 9

Firstly 15.22 g of xylitol was added to the reactor with a risen temperature to 65° C., and then 0.86 g of hydroquinone, 43.24 g of acrylic acid and 3.51 g of phosphoric acid were orderly added to the reactor with each interval of 12 minutes and constant stirring. 8.77 g of benzene was added when the temperature reached 90° C. After continual heating to 125° C., the esterification was carried out, and during this process the produced water was separated by benzene. After reaction for 4 hours, the water-carrying agent was removed by vacuum pumping, and the esterification product was obtained. 0.25 g of esterification product and 134.19 g of water were added to the reactor with a risen temperature to 60° C. for stirring 15 minutes, and then 96 g of allyl polyethylene glycol (molecular weight=800), 3.32 g of mercaptoacetic acid, 10.33 g of methacrylic acid mixed with 27.86 g of fumaric acid, and 27.4 g of ammonium persulfate solution with a mass concentration of 25% were orderly added to the reactor with each interval of 12 minutes and constant stirring. After continual heating to 80° C., the polymerization was carried out. After reaction for 4 hours, the temperature was lowered to 55° C. and the product was neutralized by 96.16 g of triethanolamine solution with a mass concentration of 45% to adjust pH value to 7.5. When cooling to 35° C., the star-shaped polycarboxylate superplasticizer solution with a mass concentration of 45% was finally obtained by mixing with 22 g of water.

EXAMPLE 10

The performance of polycarboxylate superplasticizer with a mass concentration of 45% prepared in example 9 was measured after storing 40 days at 7° C.

EXAMPLE 11

Firstly 12 g of trimethylol ethane was added to the reactor with a risen temperature to 75° C., and then 2.31 g of hydroquinone monomethyl ether, 57.65 g of acrylic acid and 5.57 g of sulfamic acid were orderly added to the reactor with each interval of 8 minutes and constant stirring. 17.41 g of cyclohexane was added when the temperature reached 95° C. After continual heating to 140° C., the esterification was carried out, and during this process the produced water was separated by cyclohexane. After reaction for 2.5 hours, the water-carrying agent was removed by vacuum pumping, and the esterification product was obtained. 0.13 g of esterification product and 100.85 g of water were added to the reactor with a risen temperature to 63° C. for stirring 12 minutes, and then 100 g of methyl alkenyl polyethylene glycol (molecular weight=2500), 3.46 g of sodium allyl sulfonate, 12.05 g of methacrylic acid, and 38.1 g of sodium persulfate solution with a mass concentration of 10% were orderly added to the reactor with each interval of 8 minutes and constant stirring. After continual heating to 85° C., the polymerization was carried out. After reaction for 3 hours, the temperature was lowered to 53° C. and the product was neutralized by 41.07 g of sodium hydroxide solution with a mass concentration of 15% to adjust pH value to 8.0. When cooling to 38° C., the star-shaped polycarboxylate superplasticizer solution with a mass concentration of 30% was finally obtained by mixing with 123.04 g of water.

EXAMPLE 12

The performance of polycarboxylate superplasticizer with a mass concentration of 30% prepared in example 11 was measured after storing 40 days at 7° C.

Implementation Effects

1. Fluidities of Cement Pastes

The fluidities of cement paste of different cement pastes for superplasticizers synthesized in each example at the same dosage were measured to investigate the effect of the synthesized star-shaped polycarboxylate superplasticizer in this invention on the fluidities of different cements. The measurements were carried out according to GB/T8077-2000 (Methods for Testing Uniformity of Concrete Admixture) at a W/C of 0.29. The dosage of superplasticizer solution was the mass ratio of its solute to cement. The commercial comb-shaped polycarboxylate superplasticizer (contrastive example) was selected as contrastive sample, and the test results are shown in Table 1.

TABLE 1

Fluidities of cement pastes

| Cement | Dosage/% | Superplasticizer | Fluidity/mm | | |
|---|---|---|---|---|---|
| | | | 0 h | 1 h | 2 h |
| Reference cement | 0.20 | Contrastive example | 265 | 224 | 182 |
| | | Example 1 | 335 | 300 | 241 |
| | | Example 2 | 323 | 267 | 219 |
| | | Example 3 | 329 | 304 | 252 |
| | | Example 4 | 325 | 291 | 265 |
| | | Example 5 | 337 | 320 | 267 |
| | | Example 6 | 318 | 283 | 255 |
| | | Example 7 | 325 | 289 | 255 |
| | | Example 8 | 325 | 270 | 240 |
| | | Example 9 | 320 | 285 | 238 |
| | | Example 10 | 311 | 255 | 211 |
| | | Example 11 | 332 | 278 | 245 |
| | | Example 12 | 320 | 275 | 240 |
| Jidong cement | 0.20 | Contrastive example | 252 | 213 | 161 |
| | | Example 1 | 317 | 265 | 222 |
| | | Example 2 | 296 | 237 | 208 |
| | | Example 3 | 319 | 260 | 209 |
| | | Example 4 | 317 | 255 | 214 |
| | | Example 5 | 323 | 277 | 225 |
| | | Example 6 | 305 | 225 | 200 |
| | | Example 7 | 300 | 261 | 218 |
| | | Example 8 | 317 | 275 | 232 |
| | | Example 9 | 310 | 252 | 200 |
| | | Example 10 | 295 | 255 | 220 |
| | | Example 11 | 315 | 268 | 203 |
| | | Example 12 | 310 | 253 | 215 |
| Liulihe cement | 0.20 | Contrastive example | 243 | 197 | 177 |
| | | Example 1 | 325 | 260 | 222 |
| | | Example 2 | 290 | 255 | 230 |
| | | Example 3 | 330 | 272 | 243 |

TABLE 1-continued

Fluidities of cement pastes

| Cement | Dosage/% | Superplasticizer | Fluidity/mm | | |
|---|---|---|---|---|---|
| | | | 0 h | 1 h | 2 h |
| | | Example 4 | 325 | 280 | 250 |
| | | Example 5 | 345 | 296 | 266 |
| | | Example 6 | 305 | 263 | 228 |
| | | Example 7 | 320 | 270 | 257 |
| | | Example 8 | 325 | 286 | 255 |
| | | Example 9 | 310 | 267 | 215 |
| | | Example 10 | 298 | 255 | 227 |
| | | Example 11 | 315 | 278 | 228 |
| | | Example 12 | 310 | 258 | 225 |
| Lafarge cement | 0.20 | Contrastive example | 255 | 208 | 176 |
| | | Example 1 | 325 | 255 | 210 |
| | | Example 2 | 306 | 270 | 205 |
| | | Example 3 | 338 | 287 | 240 |
| | | Example 4 | 325 | 290 | 233 |
| | | Example 5 | 348 | 290 | 245 |
| | | Example 6 | 325 | 287 | 243 |
| | | Example 7 | 320 | 263 | 220 |
| | | Example 8 | 325 | 255 | 230 |
| | | Example 9 | 318 | 250 | 225 |
| | | Example 10 | 305 | 263 | 225 |
| | | Example 11 | 320 | 280 | 247 |
| | | Example 12 | 318 | 268 | 235 |
| Shandong cement | 0.20 | Contrastive example | 222 | 188 | 139 |
| | | Example 1 | 317 | 254 | 209 |
| | | Example 2 | 290 | 271 | 207 |
| | | Example 3 | 320 | 262 | 201 |
| | | Example 4 | 317 | 266 | 223 |
| | | Example 5 | 322 | 290 | 250 |
| | | Example 6 | 300 | 283 | 242 |
| | | Example 7 | 295 | 237 | 184 |
| | | Example 8 | 317 | 262 | 207 |
| | | Example 9 | 302 | 255 | 195 |
| | | Example 10 | 275 | 233 | 190 |
| | | Example 11 | 305 | 248 | 202 |
| | | Example 12 | 302 | 260 | 206 |

From Table 1, all the star-shaped polycarboxylate superplasticizer solutions synthesized in this invention exhibit the excellent dispersing ability and adaptability to cement at the W/C of 0.29 and dosage of 0.20%.

2. Fluidities of Cement Pastes at Lower Dosage

The greatest feature of this star-shaped polycarboxylate superplasticizer product is that its cement paste fluidity still can remain good dispersing performance at the lower dosage (0.12-0.18%) and same W/C, compared with other comb-shaped polycarboxylate superplasticizers. The measurements were carried out according to GB/T8077-2000 (Methods for Testing Uniformity of Concrete Admixture) at a W/C of 0.29, and the Reference cement was used for testing. The dosage of superplasticizer solution was the mass ratio of its solute to cement. The commercial comb-shaped polycarboxylate superplasticizer (contrastive example) was selected as contrastive sample, and the test results are shown in Table 2.

TABLE 2

Fluidities of cement pastes at lower dosage

| W/C | Dosage/% | Superplasticizer | Fluidity/mm | | |
|---|---|---|---|---|---|
| | | | 0 h | 1 h | 2 h |
| 0.29 | 0.18 | Contrastive example | 230 | 195 | 136 |
| | | Example 1 | 315 | 273 | 206 |
| | | Example 2 | 298 | 242 | 195 |

TABLE 2-continued

Fluidities of cement pastes at lower dosage

| W/C | Dosage/% | Superplasticizer | Fluidity/mm 0 h | 1 h | 2 h |
|---|---|---|---|---|---|
| | | Example 3 | 322 | 268 | 232 |
| | | Example 4 | 315 | 253 | 224 |
| | | Example 5 | 328 | 317 | 257 |
| | | Example 6 | 305 | 252 | 216 |
| | | Example 7 | 300 | 276 | 244 |
| | | Example 8 | 318 | 244 | 226 |
| | | Example 9 | 308 | 262 | 219 |
| | | Example 10 | 295 | 251 | 203 |
| | | Example 11 | 310 | 265 | 226 |
| | | Example 12 | 308 | 266 | 228 |
| 0.29 | 0.15 | Contrastive example | 206 | 174 | — |
| | | Example 1 | 300 | 234 | 179 |
| | | Example 2 | 279 | 221 | 182 |
| | | Example 3 | 311 | 260 | 212 |
| | | Example 4 | 300 | 220 | 177 |
| | | Example 5 | 320 | 291 | 264 |
| | | Example 6 | 288 | 248 | 202 |
| | | Example 7 | 281 | 257 | 204 |
| | | Example 8 | 300 | 226 | 188 |
| | | Example 9 | 293 | 252 | 223 |
| | | Example 10 | 270 | 243 | 205 |
| | | Example 11 | 296 | 248 | 222 |
| | | Example 12 | 293 | 237 | 223 |
| 0.29 | 0.12 | Contrastive example | 172 | — | — |
| | | Example 1 | 269 | 202 | 157 |
| | | Example 2 | 258 | 195 | 168 |
| | | Example 3 | 280 | 239 | 182 |
| | | Example 4 | 249 | 201 | 155 |
| | | Example 5 | 268 | 240 | 213 |
| | | Example 6 | 245 | 215 | 170 |
| | | Example 7 | 250 | 227 | 175 |
| | | Example 8 | 269 | 200 | 156 |
| | | Example 9 | 260 | 222 | 193 |
| | | Example 10 | 255 | 208 | 167 |
| | | Example 11 | 262 | 217 | 185 |
| | | Example 12 | 260 | 209 | 182 |

From Table 2, for all the star-shaped polycarboxylate superplasticizer solutions synthesized in this invention at lower dosage, their cement pastes exhibit more excellent initial fluidities and fluidity retentions than those of contrastive example.

3. Slump and Slump Flow of Concrete

The concrete slump, slump flow and their retentions for each star-shaped polycarboxylate superplasticizer solution synthesized in this invention were measured, and the test results are shown in Table 3. Reference cement was used for testing, and the dosage of superplasticizer solution was the mass ratio of its solute to cement. The commercial comb-shaped polycarboxylate superplasticizer (contrastive example) was selected as contrastive sample.

TABLE 3

Flow properties of concretes

| Superplasticizer | Cement/g | Water/g | Sand/g | Gravel/g | Fly ash/g | Slag/g | Dosage/% | Slump/Slump flow/mm 0 h | 1 h |
|---|---|---|---|---|---|---|---|---|---|
| Contrastive example | 325 | 140 | 838 | 976 | 90 | 85 | 0.5 | 200/450 | 175/415 |
| Example 1 | 325 | 140 | 838 | 976 | 90 | 85 | 0.5 | 250/555 | 210/465 |
| Example 2 | 325 | 140 | 838 | 976 | 90 | 85 | 0.5 | 235/515 | 205/450 |
| Example 3 | 325 | 140 | 838 | 976 | 90 | 85 | 0.5 | 245/540 | 220/485 |
| Example 4 | 325 | 140 | 838 | 976 | 90 | 85 | 0.5 | 240/535 | 220/485 |
| Example 5 | 325 | 140 | 838 | 976 | 90 | 85 | 0.5 | 255/560 | 225/495 |
| Example 6 | 325 | 140 | 838 | 976 | 90 | 85 | 0.5 | 240/530 | 210/460 |
| Example 7 | 325 | 140 | 838 | 976 | 90 | 85 | 0.5 | 225/495 | 205/455 |
| Example 8 | 325 | 140 | 838 | 976 | 90 | 85 | 0.5 | 245/545 | 215/475 |
| Example 9 | 325 | 140 | 838 | 976 | 90 | 85 | 0.5 | 235/525 | 215/480 |
| Example 10 | 325 | 140 | 838 | 976 | 90 | 85 | 0.5 | 220/480 | 200/445 |
| Example 11 | 325 | 140 | 838 | 976 | 90 | 85 | 0.5 | 235/525 | 205/455 |
| Example 12 | 325 | 140 | 838 | 976 | 90 | 85 | 0.5 | 245/540 | 220/480 |

From Table 3, all the concretes for star-shaped polycarboxylate superplasticizer solutions synthesized in this invention exhibit excellent slump, slump flow and their retentions.

What is claimed is:

1. A preparation method of a star-shaped polycarboxylate superplasticizer, comprising an esterification step and a polymerization step in sequence, wherein:
   (1) the esterification step: polyol is added to a reactor and heated to a temperature of 40-80° C., and then a polymerization inhibitor, (meth)acrylic acid and catalyst are added to the reactor in turns with each interval of 5-20 minutes and constant stirring, heating is continued and a water-carrying agent is added when the temperature reaches 80-100° C., after continual heating to 100-150° C., esterification is carried out and, during the esterification, produced water is separated, after reaction for 2-10 hours, the water-carrying agent was removed by vacuum pumping, and an esterification product is obtained;
   (2) the polymerization step: the esterification product and water are added to the reactor and heated to a temperature of 50-65° C. and stirred for 10-30 minutes, and then unsaturated polyoxyethylene ether, molecular weight regulator, (meth)acrylic acid or its mixture with unsaturated carboxylic acids, and a persulfate solution with a mass concentration of 1-30% as initiator are added to the reactor in turns with each interval of 5-20 minutes and constant stirring, after continual heating to 65-90° C., polymerization is carried out, after reaction for 1.5-8 hours, the temperature is lowered to 40-60° C. and the product is neutralized by an alkaline solution with a mass concentration of 10-50% to adjust pH value to 6-8, after cooling to a temperature of 25-40° C., a solution of the star-shaped polycarboxylate superplasticizer with a desired concentration is finally obtained by mixing appropriate amount of water;
   wherein in step (1), the polyol used in the esterification is glycerol, trimethylol ethane, trimethylol propane, pentaerythritol, xylitol, mannitol or sorbitol; the inhibitor used in the esterification is hydroquinone, phenothiazine, p-tert-butylcatechol or hydroquinone monomethyl ether, with the mass dosage of 0.05-5% of the (meth)acrylic acid; the catalyst used in the esterification is p-toluenesulfonic acid, phosphoric acid or sulfamic acid, with the mass dosage of 1.5-10% of all the reactants; the water-carrying agent used in the esterification is cyclohexane, benzene or toluene, with the mass dosage of 8-30% of all the reactants, and the reactants are the polyol and (meth) acrylic acid;
   in step (2), the mass of added water is 80-120% of the mass of the unsaturated polyoxyethylene ether and (meth)acrylic acid or its mixture with unsaturated carboxylic acids; the unsaturated polyoxyethylene ether is allyl polyethylene glycol, methyl alkenyl polyethylene glycol, isobutenyl polyethylene glycol or isopentenyl polyethylene glycol; the molecular weight regulator is mercaptoacetic acid, mercaptopropionic acid, sodium methallyl sulfonate, sodium allyl sulfonate or n-dodecyl mercaptan, with the molar ratio of 0.05-0.75:1 to the unsaturated polyoxyethylene ether; the unsaturated carboxylic acids are one or several of itaconic acid, maleic acid (anhydride) and fumaric acid, with the molar ratio of 0.1-5:1 to (meth)acrylic acid mentioned in step (2); the persulfate initiator is ammonium persulfate, potassium persulfate or sodium persulfate, with the molar ratio of 0.05-0.5:1 to the unsaturated polyoxyethylene ether; the solute of the alkaline solution is sodium hydroxide, potassium hydroxide, ethylenediamine or triethanolamine, with the molar ratio of 0.7-1.2:1 to the (meth)acrylic acid or its mixture with unsaturated carboxylic acids mentioned in step (2).

2. The preparation method of a star-shaped polycarboxylate superplasticizer according to claim 1, wherein the molar ratio of (meth)acrylic acid to polyol is 3-10:1 in step (1).

3. The preparation method of a star-shaped polycarboxylate superplasticizer according to claim 1, wherein the molar ratio of the unsaturated polyoxyethylene ether to the esterification product is 5-50:1 in step (2).

4. The preparation method of a star-shaped polycarboxylate superplasticizer according to claim 1, wherein the molar ratio of (meth)acrylic acid or its mixture with unsaturated carboxylic acids to the unsaturated polyoxyethylene ether is 1.5-4:1 in step (2).

* * * * *